United States Patent
Bach

[11] Patent Number: 5,592,062
[45] Date of Patent: Jan. 7, 1997

[54] CONTROLLER FOR AC INDUCTION MOTORS

[76] Inventor: Daniel G. Bach, 11809 Warpaint Dr., Phoenix, Ariz. 85044

[21] Appl. No.: 207,588

[22] Filed: Mar. 8, 1994

[51] Int. Cl.$^6$ .................................................. H02P 7/00
[52] U.S. Cl. ........................................ 318/805; 318/809
[58] Field of Search .................................. 318/798–815, 318/727, 772; 363/92, 132, 40, 41, 56, 58, 59, 60, 89, 97, 131

[56] References Cited

U.S. PATENT DOCUMENTS

| | | |
|---|---|---|
| 4,052,648 | 10/1977 | Nola . |
| 4,176,307 | 11/1979 | Parker . |
| 4,190,793 | 2/1980 | Parker . |
| 4,242,625 | 11/1980 | Hedges . |
| 4,297,628 | 10/1981 | Hedges . |
| 4,382,223 | 5/1983 | Hedges . |
| 4,388,578 | 6/1983 | Green et al. ............................ 318/778 |
| 4,414,499 | 11/1983 | Hedges . |
| 4,454,462 | 6/1984 | Spann ................................ 318/805 X |
| 4,459,529 | 7/1984 | Johnson ............................. 318/812 X |
| 4,469,998 | 9/1984 | Nola . |
| 4,629,960 | 12/1986 | Welsh . |
| 4,636,702 | 1/1987 | Hedges . |
| 4,710,692 | 12/1987 | Muskavoc . |
| 4,727,305 | 2/1988 | Muskovac . |
| 4,767,975 | 8/1988 | Unsworth . |
| 4,796,142 | 1/1989 | Libert . |
| 4,800,326 | 1/1989 | Unsworth ........................... 318/812 X |
| 4,833,628 | 5/1989 | Curran . |
| 4,864,212 | 9/1989 | Parker . |
| 4,876,468 | 10/1989 | Libert . |
| 4,910,450 | 3/1990 | Parker . |
| 4,912,390 | 3/1990 | Curran . |
| 5,008,608 | 4/1991 | Unsworth et al. .................. 318/805 X |
| 5,013,990 | 5/1991 | Weber .................................. 318/814 |
| 5,151,642 | 9/1992 | Lombardi . |
| 5,161,393 | 11/1992 | Payac . |
| 5,204,606 | 4/1993 | Kuwahara et al. ..................... 318/800 |
| 5,239,252 | 8/1993 | Runggaldier et al. ................. 318/806 |

OTHER PUBLICATIONS

The Arizona Republic, Sunday, Aug. 8, 1993, "Motor Controllers Give Low–Cost Boost to Appliances" by James Dulley.

Primary Examiner—Jonathan Wysocki
Attorney, Agent, or Firm—Donald J. Lenkszus

[57] ABSTRACT

A controller for use with AC induction motors utilizes a microcontroller in conjunction with a triac to control the duty cycle of the AC power applied to the motor. A voltage sensing circuit provides signals to the microcontroller. The microcontroller is also coupled to the gate of a triac. The microcontroller automatically selects the appropriate parameters for most efficient motor operation based upon the motor power factor as determined by the time at which the voltage across the motor crosses zero and the voltage at the triac gate crosses zero.

11 Claims, 1 Drawing Sheet

5,592,062

CONTROLLER FOR AC INDUCTION MOTORS

BACKGROUND OF THE INVENTION

This invention relates generally to motor controllers and more particularly to a power factor type motor controller for AC induction motors.

The induction motor is one of the most commonly used motors. It operates at a constant speed which is independent of both load and applied voltage within certain limits. As pointed out in U.S. Pat. No. 4,404,511 issued Sep. 13, 1983 to Frank J. Nola and assigned to the National Aeronautics and Space Administration, an induction motor will consume much more energy than it requires for operation when it is operating under light load conditions. The voltage applied to an induction motor should be a function of the load for efficient operation. Because of the variations in the operating line voltage, most induction motors are designed to deliver rated load plus a safety margin at an undervoltage which is less than the typical line voltage rating. By way of example, a 115-volt motor may be designed to deliver its rated load at 105 volts. In addition, because induction motors draw the same current whether loaded or unloaded, the motor efficiency goes down when less than a rated load is applied to the motor. In other words, an AC induction motor will consume much more energy than it requires under light load conditions.

In the prior motor controller design of Nola, a resistor is used to sense the motor inrush current. The circuitry is used to generate a control signal which represents the phase shift difference between the motor current and the motor voltage, i.e., the power factor. As loading on the motor changes the power factor will change and the off time of the duty cycle of the AC line power applied to the motor is changed. As the power factor decreases, the duty cycle is decreased, i.e., the motor is turned off for a longer period of time. In this arrangement, the amount of power savings is scaled according to the power sensed.

My prior patent application titled Microcomputer Controlled Load Controller U.S. Ser. No. 08/134,207, which was filed Oct. 8, 1993, describes a microprocessor based load controller. However, like the Nola circuit, the illustrative embodiment of my prior circuit utilized a toroidal core transformer to provide current sampling.

A.C. induction motors are rather inefficient when they are not matched properly to their load. A motor is most efficient when it is heavily loaded and the rotor "slips" from its unloaded synchronous speed. As a bi-product of rotor slip, power factor is effected making the current closer in phase to the voltage.

Rotor slip can be induced not only by loading a motor, but also by reducing its average applied power in such a manner as to remove sections of the sinusoidal excitation waveform. Such a technique can greatly enhance the efficiency of the motor under light load conditions. The ultimate results is realized in power savings and lower operating costs.

It is one object of the present inventor to provide an arrangement in which the toroidal core transformer is eliminated.

SUMMARY OF THE INVENTION

This and other objects are achieved in a motor controller in accordance with the invention.

In accordance with my invention, the power factor can be determined without the use of a toroid or other electromagnetic sensing element. It has been determined that absolute current measurements are not required. In order to detect the power factor in accordance with the principles of my invention only the zero crossing of the current relative to the voltage needs to be detected.

In a motor controller for A.C. induction motors in accordance with the invention, a triac is placed in circuit with each phase winding of the motor. The voltage at the triac gate is monitored. This gate voltage is used to provide a signal which indicates when current flow through the motor crosses zero. A voltage sampler circuit provides signals which identify when the voltage applied to the motor crosses zero. Both signals are supplied to a microcontroller which provides a pulse width modulated digital output signal which in turn controls the triac to control the power supplied to the motor by varying the duty cycle of the power applied to the motor windings.

BRIEF DESCRIPTION OF THE DRAWING

The invention may be better understood by a reading of the following detailed description taken in conjunction with the drawing in which.

DETAILED DESCRIPTION

Figure 1:
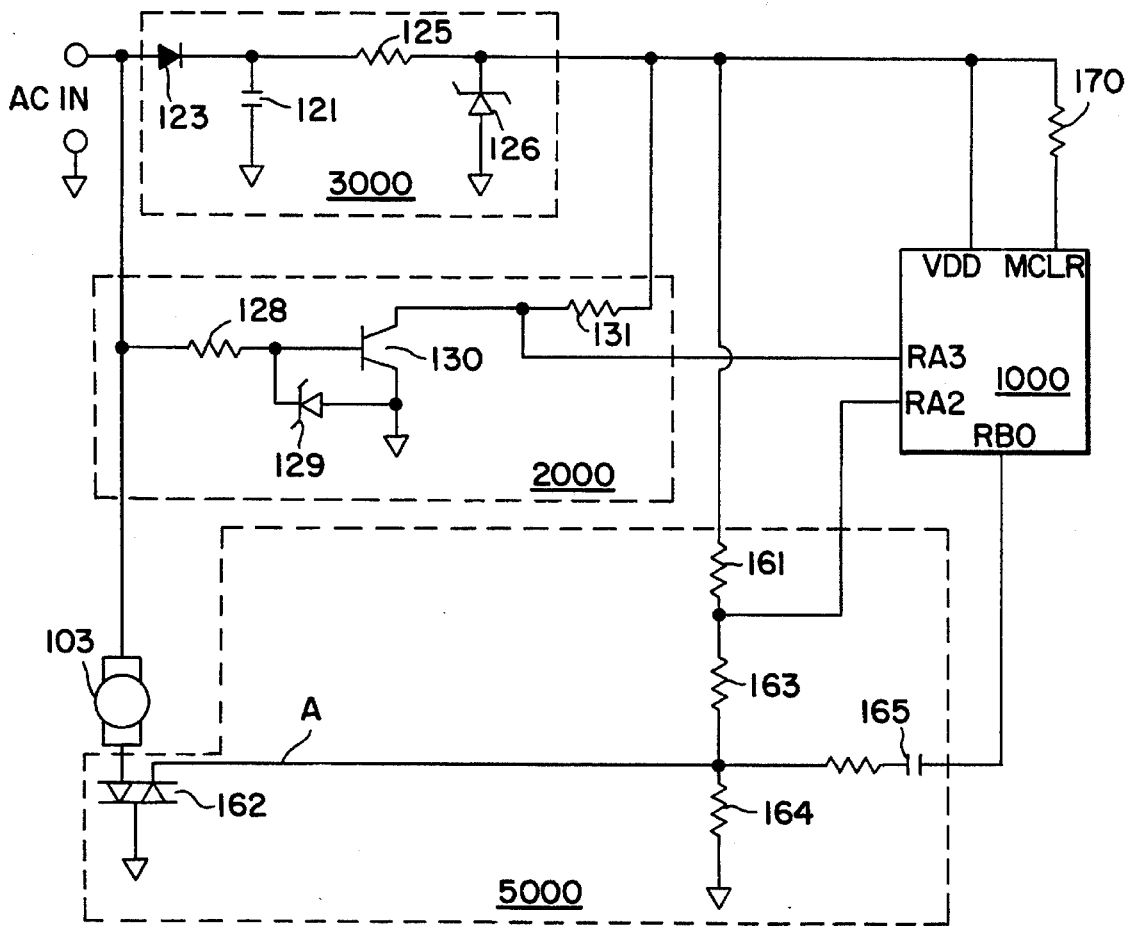
FIG. 1 is a schematic circuit diagram, partially in block form, of a motor controller in accordance with the principles of the invention.

A power supply 3000 includes a rectifier diode 123 and a filter capacitor 121. Capacitor 121 and resistor 125 provide filtering to smooth the DC output of rectifier 123. Zener diode 126 acts to regulate the output of the power supply to 5 volts to supply power to the microprocessor 1000. A resistor 170 is coupled to the output of the power supply 3000 and to the input MCLR of microcontroller 1000 to provide a "power-on" master clear signal to the microcontroller.

A voltage crossing circuit 2000 includes a resistor 128 coupled between the AC line and the base of transistor 130. A zener diode 129 is connected to the base of transistor 130 to clamp the voltage at the base to a maximum value. The collector of transistor 130 is coupled to the DC output of power supply 3000. An output of the voltage crossing circuit is coupled to input RA3 of the microcontroller 1000.

A control circuit 5000 includes a triac 162 coupled in series with the AC induction motor 103. The gate of the triac is coupled to a voltage divider including resistors 161, 163, and 164. The junction of resistors 161 and 163 is coupled to input RA2 of the microcontroller 1000. Microcontroller 1000 has a control signal output RB0 coupled to the gate of triac of 162 via the series combination of capacitor 165 and resistor 160 which is in turn connected to the voltage divider at the junction of resistors 163 and 164.

Figure 2:
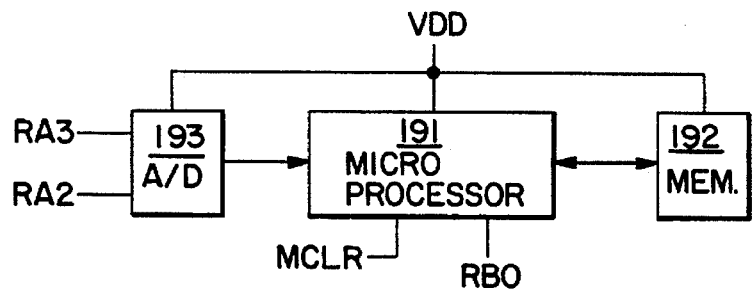
FIG. 2 is a block diagram of the microprocessor of FIG. 1.

The microcontroller 1000 as illustrated in block diagram form in FIG. 2 includes a microprocessor 191, its associated memory 192 and analog digital convertor 193. The microcontroller 1000 is a commercially available product.

In operation, the A/D convertor 193 samples the signal waveforms at its inputs RA2 and RA3 approximately every 30 microseconds and converts each sample into an 8 bit digital word. For each half cycle of the AC waveform a sampling 120 Hertz signal is generated. The microprocessor 121 is programmed to look for when each of its inputs RA3 and RA2 crosses zero.

Turning back to FIG. 1, the microcontroller 1000 senses the zero voltage crossing of the line voltage AC waveform from the output of the signal generated by the voltage crossing circuit 2000 at input RA3. Microcontroller 1000 senses the zero voltage crossing of the voltage at the gate to the triac 162 at its input to the microcontroller 1000 at RA2. Microcontroller 1000 provides a control signal at its output RB0 which is applied to the gate of triac 162 of FIG. 1. This signal will cause the triac 162 to turn on. Once turned on, triac 162 will not turn off until the AC current flowing through it crosses zero.

At "power-on" the first pulses at input RA3 are used to measure the frequency of the line voltage as a relative number. The frequency will vary because of either 50 or 60 Hertz operation. The relative number measurement is used by the microprocessor 1000 to automatically modify the operation of the circuit for 50 or 60 Hertz operation. An internal timer in the microprocessor 1000 runs on 30 microsecond interrupts.

During an interrupt, microprocessor 191 clears an internal register and begins counting up. Microprocessor 191 also, assigns a number based upon the current signal level at point A. The number obtained or derived from the signal at point A is compared to the count of the internal counter which is cleared at zero crossing and counts up at a 30 microsecond rate. When the count reaches the number representing the signal level at A, then triac 162 of FIG. 1 is turned on.

One feature of the present invention is that its operation changes with resistive loads. In prior circuits, if the motor is off and the current load is low, the circuit will reduce the effective voltage. However, where such a motor controller is used with a refrigerator motor, the undesired result is that the lights in the refrigerator dim if the refrigerator motor is off. In the present circuit, if a purely resistive load is present, the voltage is not reduced with the result that the refrigerator light receives full voltage and is not dimmed. When the microcontroller 1000 receives signals at its input RA2 and RA3 which are indicative of a power factor of 1, then the microcontroller program will interpret that condition as being one in which full power should be applied, i.e., one hundred percent duty cycle. The result is that the light bulb will not dim. In fact, when it is determined by the microcontroller 1000 that the power factor is within a certain range, then the duty cycle is increased to 100 percent to allow for those instances when the motor is running and the refrigerator light must be on.

When power is first supplied to the load controller the microcontroller 1000 will enter into a soft start routine. In accordance with that routine, power is initially applied to motor 103 at a 25% level, i.e., at a 25% duty cycle, and is gradually increased to full power over one-half to three-fourths of a second. After a soft start interval, the normal servo operation of the microcontroller 1000 becomes operative. In the servo mode, a low pass filter is utilized such that if the removal of a load is detected, the microprocessor 191 does not change the duty cycle instantaneously. The duty cycle and therefore power is changed over a predetermined period of time.

If the microcontroller 1000 senses a high load condition, the microcontroller 1000 immediately switches triac 162 continuously on at a 100 percent duty cycle.

Turning back to FIG. 1, microcontroller 1000 senses the zero voltage crossing of the AC line voltage applied to motor 103 via the voltage crossing circuit 2000. Voltage crossing circuit 2000 generates a signal at microcontroller input RA3.

Microcontroller 1000 also senses the zero crossing of the current applied to motor 103 from the voltage sensed at the gate of triac 162 via the voltage divider formed by resistors 161, 163 and 164 applied to input RA2.

When triac 162 conducts it will remain in the conductive state after removal of the signal applied to the triac gate until the triac load current reaches zero. This is due to the inherent feedback properties of a triac. When triac 162 is not conductive, the gate voltage is zero. When the triac 162 is in the conductive state, the voltage at the gate will be approximately 1.5 volts.

The point in time that the triac 162 gate voltage signals that the gate current goes to zero relative to the point in time that the signal at RA2 indicates that the voltage at the gate of triac 162 has gone to zero is an indication of the power factor.

Although the invention has been described in detail with respect to only one exemplary embodiment shown herein, it will be understood by those of ordinary skill in the art that variations and modifications may be made within the spirit and scope of the invention.

What is claimed is:

1. A controller for an AC induction motor coupled to an AC power source, said controller comprising:

a circuit for providing a voltage signal in phase with voltage applied to said motor from said AC power source:

a triac coupled between said motor and said AC power source, said triac having a gate and being switchable from a non-conductive state to a conductive state in response to a control signal applied to said gate, said triac remaining in said conductive state until current flowing through said triac becomes zero; and a microcontroller coupled to said circuit and to said gate, and responsive to said voltage signal and the voltage at said gate of said triac during at least the time that said motor is to be operated after an initial start period for determining a time during each AC cycle that said triac is rendered conductive to couple said AC power source to said motor and to generate said control signal in accordance with said time.

2. A controller in accordance with claim 1, wherein said microcontroller comprises:

an analog to digital convertor receiving said voltage signal and said gate voltage and converting each to corresponding digital signals; and a microprocessor operating in response to said digital signals to determine a motor power factor and to generate said control signal.

3. A controller in accordance with claim 2 wherein:

said microcontroller is operative when said motor power factor is within a predetermined range to generate said control signal to cause said triac to be continuously in said conductive state.

4. A controller in accordance with claim 3 wherein said predetermined range is indicative of a load having a substantial resistive component.

5. A controller in accordance with claim 1 wherein:

said microcontroller is further operative such that when said voltage signal and said gate voltage have a predetermined relationship, said microcontroller generates said control signal to cause said triac to continuously be in said conductive state.

6. A controller in accordance with claim 1 wherein:

said microcontroller is operative such that when said motor is started, said microcontroller generates said control signal to cause said triac to be switched to said conductive state for a first predetermined time period such that AC power is initially applied to said motor at a first predetermined level.

7. A controller in accordance with claim 6 wherein:

said microcontroller is further operative such that the duration of time that said triac is in said conductive state is increased in subsequent AC cycles from said first predetermined time period in a predetermined manner.

8. A controller in accordance with claim 1 wherein:

said microcontroller is operative in response to parameters indicative of the size of said motor to generate said control signals.

9. A controller for an AC induction motor coupled to an AC power source, comprising:

a circuit coupled to said motor to provide a voltage signal indicating when AC voltage applied to said motor crosses zero:

a triac coupled between said motor and said AC power source, said triac having a gate and being switchable from a non-conductive state to a conductive state in response to a control signal applied to said gate, said triac remaining in said conductive state until current flowing through said triac goes to zero whereupon said triac switches to said nonconductive state; and a microcontroller connected to said circuit and to said gate of said triac for monitoring said voltage signal and said gate voltage, said microcontroller generating said control signals at least during the time that said motor is operated after an initial start up period such that the duration of time during each AC cycle that the triac connects power to said motor is varied in inverse proportion to the difference in phase between said gate voltage and said voltage signal.

10. A controller in accordance with claim 9 wherein:

said microcontroller determines the power line frequency of said AC power source from said voltage signal said controller automatically adjusting timing of said control signals in accordance with said frequency.

11. Apparatus comprising:

an AC induction motor;

a controller for said motor, said controller comprising:

a triac coupled between said motor and an AC power source, said triac having a gate and being switchable from a non-conductive state to a conductive state in response to a control signal at a gate terminal;

a circuit for providing a voltage signal indicative of when the voltage applaud to said motor crosses zero; and a microcontroller coupled to said circuit and to said gate to receive said voltage signal and the voltage at said gate, and coupled to said gate for supplying said control signal thereto during at least the time said motor is operated after an initial start up period such that the duration of time during each AC cycle that said triac is in said conductive state is varied in accordance with a predetermined relationship between said voltage signal and said gate voltage.

\* \* \* \* \*